US011437031B2

(12) United States Patent
Yun et al.

(10) Patent No.: US 11,437,031 B2
(45) Date of Patent: Sep. 6, 2022

(54) ACTIVATING SPEECH RECOGNITION BASED ON HAND PATTERNS DETECTED USING PLURALITY OF FILTERS

(71) Applicant: QUALCOMM Incorporated, San Diego, CA (US)

(72) Inventors: Sungrack Yun, Seongnam-si (KR); Young Mo Kang, Redwood City, CA (US); Hye Jin Jang, Seoul (KR); Byeonggeun Kim, Seoul (KR); Kyu Woong Hwang, Daejeon (KR)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 16/526,608

(22) Filed: Jul. 30, 2019

(65) Prior Publication Data

US 2021/0035571 A1    Feb. 4, 2021

(51) Int. Cl.
| | |
|---|---|
| G06F 3/01 | (2006.01) |
| G06K 9/62 | (2022.01) |
| B60H 1/00 | (2006.01) |
| G06F 13/42 | (2006.01) |
| G10L 17/22 | (2013.01) |
| G06F 3/16 | (2006.01) |
| G10L 15/22 | (2006.01) |
| G06F 1/3231 | (2019.01) |
| G10L 15/08 | (2006.01) |
| G06V 40/10 | (2022.01) |

(52) U.S. Cl.
CPC ............ *G10L 15/22* (2013.01); *G06F 1/3231* (2013.01); *G06V 40/107* (2022.01); *G10L 15/08* (2013.01); *G10L 2015/227* (2013.01)

(58) Field of Classification Search
CPC ...... G06F 3/017; G06F 13/4204; G06F 3/167; G06F 1/1616; G06K 9/628; B60H 1/00742; G10L 17/22
USPC ............ 704/275; 701/36; 455/563; 345/173
See application file for complete search history.

(56) References Cited

U.S. PATENT DOCUMENTS

| | | | |
|---|---|---|---|
| 2002/0077830 A1* | 6/2002 | Suomela ................ | G06F 3/167 704/275 |
| 2009/0253463 A1* | 10/2009 | Shin ....................... | G10L 17/22 455/563 |
| 2011/0018821 A1* | 1/2011 | Kii ......................... | G06F 1/1616 345/173 |

(Continued)

FOREIGN PATENT DOCUMENTS

| | | |
|---|---|---|
| CN | 207758675 U | 8/2018 |
| EP | 2109295 A1 | 10/2009 |
| EP | 2743799 A2 | 6/2014 |

OTHER PUBLICATIONS

International Search Report and Written Opinion—PCT/US2020/044127—ISA/EPO—dated Sep. 16, 2020.

*Primary Examiner* — Farzad Kazeminezhad
(74) *Attorney, Agent, or Firm* — QUALCOMM Incorporated

(57) ABSTRACT

A device to process an audio signal representing input sound includes a hand detector configured to generate a first indication responsive to detection of at least a portion of a hand over at least a portion of the device. The device also includes an automatic speech recognition system configured to be activated, responsive to the first indication, to process the audio signal.

30 Claims, 8 Drawing Sheets

(56) References Cited

U.S. PATENT DOCUMENTS

| | | | | |
|---|---|---|---|---|
| 2012/0179472 A1* | 7/2012 | Ryu | ............... | G06F 3/017 |
| | | | | 704/275 |
| 2013/0085757 A1 | 4/2013 | Nakamura et al. | | |
| 2015/0105976 A1* | 4/2015 | Shikii | ............... | B60H 1/00742 |
| | | | | 701/36 |
| 2020/0104629 A1* | 4/2020 | Hiroki | ............... | G06K 9/628 |
| 2020/0202851 A1* | 6/2020 | Gao | ............... | G06F 13/4204 |

* cited by examiner

ACTIVATING SPEECH RECOGNITION BASED ON HAND PATTERNS DETECTED USING PLURALITY OF FILTERS

I. FIELD

The present disclosure is generally related to speech recognition and more specifically, to activating a speech activation system.

II. DESCRIPTION OF RELATED ART

Speech recognition is often used to enable an electronic device to interpret spoken questions or commands from users. Such spoken questions or commands can be identified by analyzing an audio signal, such as a microphone input, at an automatic speech recognition (ASR) engine that generates a textual output of the spoken questions or commands. An "always-on" ASR system enables the electronic device to continually scan audio input to detect user commands or questions in the audio input. However, continual operation of the ASR system results in relatively high power consumption, which reduces battery life when implemented in a mobile device.

In some devices, a spoken voice command will not be recognized unless it is preceded by a spoken activation keyword. Recognition of the activation keyword enables such devices to activate the ASR engine to process the voice command. However, speaking an activation keyword before every command uses additional time and requires the speaker to use correct pronunciation and proper intonation. In other devices, a dedicated button is provided for the user to press to initiate speech recognition. However, in some circumstances, such as when operating a vehicle, locating and precisely pressing the button can result in a diversion of the user's attention from other tasks.

III. SUMMARY

According to one implementation of the present disclosure, a device to process an audio signal representing input sound includes a hand detector configured to generate a first indication responsive to detection of at least a portion of a hand over at least a portion of the device. The device also includes an automatic speech recognition system configured to be activated, responsive to the first indication, to process the audio signal.

According to another aspect of the present disclosure, a method of processing an audio signal representing input sound includes detecting, at a device, at least a portion of a hand over at least a portion of the device. The method also includes, responsive to detecting the portion of the hand over the portion of the device, activating an automatic speech recognition system to process the audio signal.

According to another aspect of the present disclosure, a non-transitory computer-readable medium includes instructions that, when executed by one or more processors of a device, cause the one or more processors to perform operations for processing an audio signal representing input sound. The operations include detecting at least a portion of a hand over at least a portion of the device and, responsive to detecting the portion of the hand over the portion of the device, activating an automatic speech recognition system to process the audio signal.

According to another aspect of the present disclosure, an apparatus to process an audio signal representing input sound includes means for detecting at least a portion of a hand over at least a portion of a device and means for processing the audio signal. The means for processing is configured to be activated responsive to detection of the portion of a hand over at the portion of the device.

IV. BRIEF DESCRIPTION OF THE DRAWINGS

V. DETAILED DESCRIPTION

Figure 1:
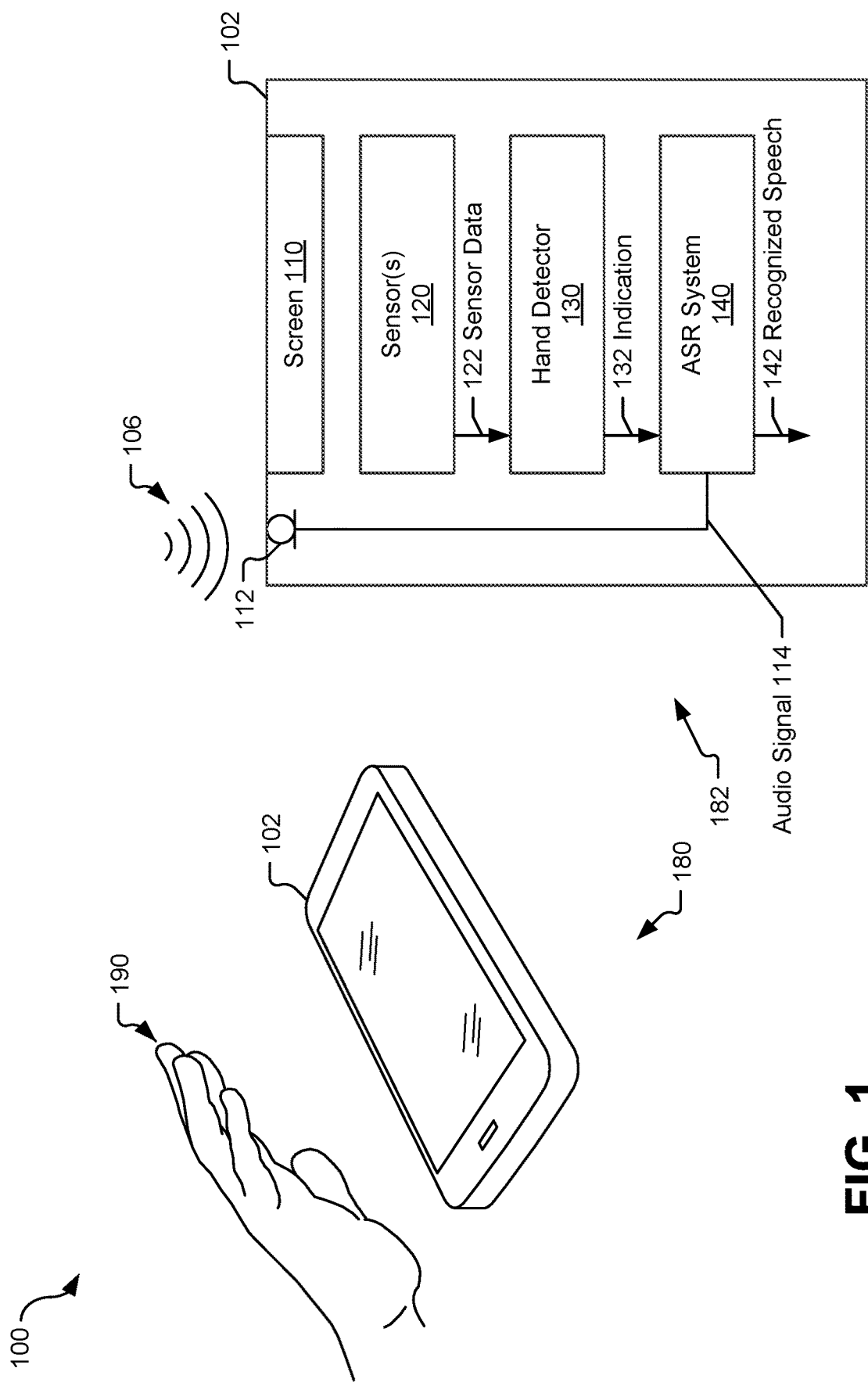
FIG. 1 is a diagram of a particular illustrative implementation of a system including a device operable to activate speech recognition.

Devices and methods to activate a speech recognition system are disclosed. Because an always-on ASR system that continually scans audio input to detect user commands or questions in the audio input results in relatively high power consumption, battery life is reduced when the ASR engine is implemented in a mobile device. In an attempt to reduce power consumption, some systems may use a reduced-capacity speech recognition processor that consumes less power than a full-power ASR engine to perform keyword detection on the audio input. When an activation keyword is detected, the full-power ASR engine can be activated to process a voice command that follows the activation keyword. However, requiring a user to speak an activation keyword before every command is time consuming and requires the speaker to use correct pronunciation and proper intonation. Devices that require the user to press a dedicated button to initiate speech recognition can result in an unsafe diversion of the user's attention, such as when operating a vehicle.

As described herein, speech recognition is activated in response to detecting a hand over a portion of a device, such as a user's hand hovering over a screen of the device. The user can activate speech recognition for a voice command by positioning the user's hand over the device and without having to speak an activation keyword or having to precisely locate and press a dedicated button. Removal of the user's hand from over the device can signal that the user has finished speaking the voice command. As a result, speech recognition can be activated conveniently and safely, such as when the user is operating a vehicle. Further, because positioning the user's hand over the device can signal the device to initiate the speech recognition and removing the user's hand from over the device signals an end of the user's voice command, improper activation of the speech recognition and inaccurate detection of the end of voice commands can both be reduced.

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearby wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more."

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include smart speakers, speaker bars, cellular phones, personal digital assistants (PDAs), handheld devices, headsets, wireless modems, laptop computers, personal computers, etc.

FIG. 1 depicts a system 100 that includes a device 102 that is configured to activate an ASR system 140 to process an input sound 106, such as a voice command, when at least a portion of a hand 190 is positioned over the device 102. The device 102 includes one or more microphones, represented as a microphone 112, a screen 110, one or more sensors 120, a hand detector 130, and the ASR system 140. A perspective view 180 illustrates the hand 190 positioned over the device 102, and a block diagram 182 illustrates components of the device 102. In some implementations, the device 102 can include a portable communication device (e.g., a "smart phone"), a vehicle system (e.g., a speech interface for an automobile entertainment system, navigation system, or self-driving control system), a virtual reality or augmented reality headset, or a wireless speaker and voice command device with an integrated assistant application (e.g., a "smart speaker" device), as illustrative, non-limiting examples.

The microphone 112 is configured to generate an audio signal 114 responsive to the input sound 106. In some implementations, the microphone 112 is configured to be activated, responsive to an indication 132, to generate the audio signal 114, as described further with reference to FIG. 3.

The one or more sensors 120 are coupled to the hand detector 130 and configured to provide sensor data 122 to the hand detector 130. For example, the sensor(s) 120 can include one or more cameras, such as a low-power ambient light sensor or a main camera, an infrared sensor, an ultrasound sensor, one or more other sensors, or any combination thereof, such as described further with reference to FIG. 2.

The hand detector 130 is configured to generate the indication 132 responsive to detection of at least a portion of a hand over at least a portion of the device 102, such as over the screen 110. As used herein, "at least a portion of a hand" can correspond to any part of a hand (e.g., one or more fingers, a thumb, a palm or a back of the hand, or any portion thereof, or any combination thereof) or can correspond to an entire hand, as illustrative, non-limiting examples. As used herein, "detecting a hand" is equivalent to "detecting at least a portion of a hand" and can include detecting two or more fingers, detecting at least one finger connected to a portion of a palm, detecting a thumb and at least one finger, detecting a thumb connected to at least a portion of a palm, or detecting an entire hand (e.g., four fingers, a thumb, and a palm), as illustrative, non-limiting examples.

Although the hand 190 is described as being detected "over" the device 102, "over" the device 102 refers to being located at a specified relative position (or within a specified range of positions) relative to the position and orientation of the one or more sensors 120. In an example in which the device 102 is oriented so that the sensor(s) 120 face upward, such as illustrated in FIG. 1, detecting the hand 190 over the device 102 indicates that the hand 190 is above the device 102. In an example in which the device 102 is oriented so that the sensor(s) 120 face downward, detecting the hand 190 over the device 102 indicates that the hand 190 is below the device 102.

The hand detector 130 is configured to process the sensor data 122 to determine whether the hand 190 is detected over the device 102. For example, as described further with reference to FIG. 2, in some implementations the hand detector 130 processes image data to determine whether a hand shape has been captured by a camera, processes infrared data to determine whether a detected temperature of the hand 190 corresponds to a hand temperature, processes ultrasound data to determine whether a distance between the hand 190 and the device 102 is within a specified range, or a combination thereof.

In some implementations, the device 102 is configured to generate a notification for a user of the device 102 to indicate, responsive to detecting the hand 190 over the device 102, that speech recognition has been activated, and may further be configured to generate a second notification to indicate, responsive to no longer detecting the hand 190 over the device 102, that voice input for speech recognition is deactivated. For example, the device 102 may be configured to generate an audio signal such as a chime or a voice message such as "ready," a visual signal such as an illuminated or blinking light, a digital signal to be played out by another device, such as by a car entertainment system in communication with the device, or any combination thereof. Generating the notification(s) enables the user to confirm that the device 102 is ready to receive a voice command and may further enable the user to detect and prevent false activations (e.g., caused by another object that may be misidentified as the hand 190) and missed activations due to improper positioning of the hand 190. Because each activation of the ASR system 140 consumes power and uses processing resources, reducing false activations results in reduced power consumption and processing resource usage.

The ASR system 140 is configured to be activated, responsive to the indication 132, to process the audio signal 114. In an illustrative example, a specific bit of a control register represents the presence or absence of the indication 132 and a control circuit within or coupled to the ASR system 140 is configured to read the specific bit. A "1" value of the bit corresponds to the indication 132 and causes the ASR system 140 to activate. In other implementations, the indication 132 is instead implemented as a digital or analog signal on a bus or a control line, an interrupt flag at an interrupt controller, or an optical or mechanical signal, as illustrative, non-limiting examples.

When activated, the ASR system 140 is configured to process one or more portions (e.g., frames) of the audio signal 114 that include the input sound 106. For example, the device 102 can buffer a series of frames of the audio signal 114 as the sensor data 122 being processed by the hand detector 130 so that, upon the indication 132 being generated, the ASR system 140 can process the buffered series of frames and generate an output indicative of the user's speech. The ASR system 140 can provide recognized speech 142 as a text output of the speech content of the input sound 106 to another component of the device 102, such as a "virtual assistant" application or other application as described with reference to FIG. 3, to initiate an action based on the speech content.

When deactivated, the ASR system 140 does not process the audio signal 114 and consumes less power than when activated. For example, deactivation of the ASR system 140 can include gating an input circuit of the ASR system 140 to prevent the audio signal 114 from being input to the ASR system 140, gating a clock signal to prevent circuit switching within the ASR system 140, or both, to reduce dynamic power consumption. As another example, deactivation of the ASR system 140 can include reducing a power supply to the ASR system 140 to reduce static power consumption without losing the state of the circuit elements, removing power from at least a portion of the ASR system 140, or a combination thereof.

In some implementations, the hand detector 130, the ASR system 140, or any combination thereof, are implemented using dedicated circuitry or hardware. In some implementations, the hand detector 130, the ASR system 140, or any combination thereof, are implemented via execution of firmware or software. To illustrate, the device 102 can include a memory configured to store instructions and one or more processors configured to execute the instructions to implement the hand detector 130 and the ASR system 140, such as described further with reference to FIG. 9.

During operation, a user can position the user's hand 190 over the device 102 prior to speaking a voice command. The hand detector 130 processes the sensor data 122 to determine that the hand 190 is over the device 102. In response to detecting the hand 190 over the device 102, the hand detector 130 generates the indication 132, which causes activation of the ASR system 140. After receiving the voice command at the microphone 112, the ASR system 140 processes the corresponding portion(s) of the audio signal 114 to generate the recognized speech 142 indicating the voice command.

Activation of the ASR system 140 when a hand is detected over the device 102 enables a user of the device 102 to activate speech recognition for a voice command by positioning the user's hand 190 over the device, without the user having to speak an activation keyword or having to precisely locate and press a dedicated button. As a result, speech recognition can be activated conveniently and safely, such as when the user is operating a vehicle. Further, because positioning the user's hand over the device signals the device to initiate speech recognition, improper activation of the speech recognition can both be reduced as compared to a system that instead uses keyword detection to activate speech recognition.

Figure 2:
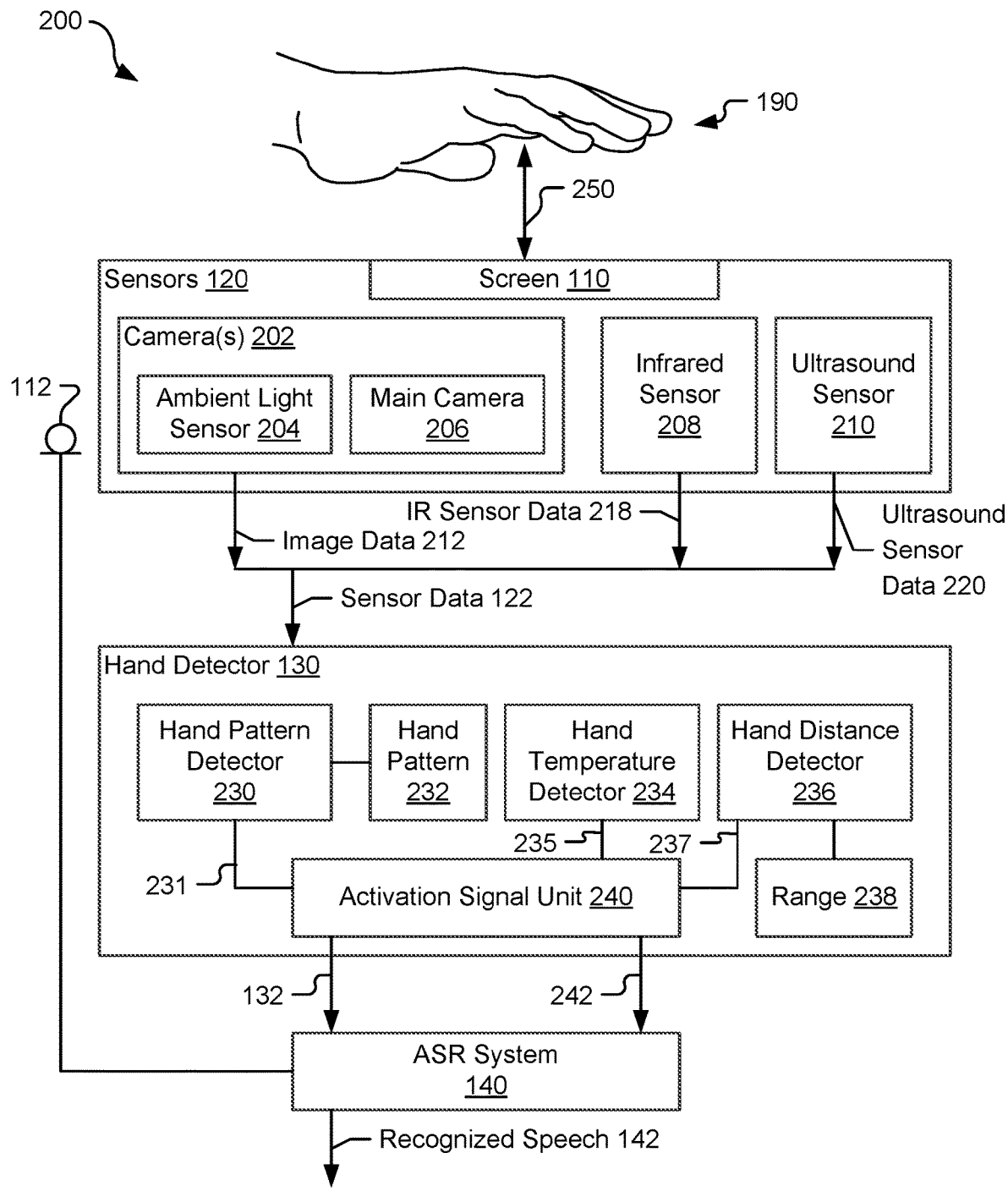
FIG. 2 is a diagram that includes a particular example of components that can be implemented in the device of FIG. 1.

FIG. 2 depicts an example 200 showing further aspects of components that can be implemented in the device 102 of FIG. 1. As illustrated in FIG. 2, the sensors 120 include one or more cameras 202 configured to provide image data 212 to the hand detector 130, an infrared (IR) sensor 208 configured to provide infrared sensor data 218 to the hand detector 130, and an ultrasound sensor 210 configured to provide ultrasound sensor data 220 to the hand detector. The image data 212, the infrared sensor data 218, and the ultrasound sensor data 220 are included in the sensor data 122. The cameras 202 include a low-power ambient light sensor 204 configured to generate at least part of the image data 212, a main camera 206 configured to generate at least part of the image data 212, or both. Although the main camera 206 can capture image data having a higher resolution than the ambient light sensor 204, the ambient light sensor 204 can generate image data having sufficient resolution to perform hand detection and operates using less power than the main camera 206.

The hand detector 130 includes a hand pattern detector 230, a hand temperature detector 234, a hand distance detector 236, and an activation signal unit 240. The hand pattern detector 230 is configured to process the image data 212 to determine whether the image data 212 includes a hand pattern 232. In an example implementation, the hand pattern detector 230 processes the image data 212 using a neural network trained to recognize the hand pattern 232. In another example implementation, the hand pattern detector 230 applies one or more filters to the image data 212 to identify the hand pattern 232. The hand pattern detector 230 is configured to send a first signal 231 to the activation signal unit 240 that indicates whether the hand pattern 232 is detected. Although a single hand pattern 232 is depicted, in other implementations multiple hand patterns may be included that represent differing aspects of a hand, such as a fingers-together pattern, a fingers-spread pattern, a partial hand pattern, etc.

The hand temperature detector 234 is configured to process the infrared sensor data 218 from the infrared sensor 208 and to send a second signal 235 to the activation signal unit 240 that indicates whether the infrared sensor data 218 indicates a temperature source having a temperature indicative of a human hand. In some implementations, the hand temperature detector 234 is configured to determine whether at least a portion of a field of view of the infrared sensor 208 has a temperature sources in a temperature range indicative of a human hand. In some implementations, the hand temperature detector 234 is configured to receive data indicating a location of a hand from the hand pattern detector 230 to determine whether a temperature source at the hand location matches the temperature range of a human hand.

The hand distance detector 236 is configured to determine a distance 250 between the hand 190 and at least a portion of the device 102. In an example, the hand distance detector 236 processes the ultrasound sensor data 220 and generates a third signal 237 that indicates whether the hand 190 is within specified a range 238 of distances. In some implementations the hand distance detector 236 receives data from the hand pattern detector 230, from the hand temperature detector 234, or both, that indicates a location of the hand 190 and uses the hand location data to determine a region in the field of view of the ultrasound sensor 210 that corresponds to the hand 190. In other implementations, the hand distance detector 236 identifies the hand 190 by locating a nearest object to the screen 110 that exceeds a specified portion (e.g., 25%) of the field of view of the ultrasound sensor 210.

In a particular implementation, the range 238 has a lower bound of 10 centimeters (cm) and an upper bound of 30 cm (i.e., the range 238 includes distances that are greater than or equal to 10 cm and less than or equal to 30 cm). In other implementations, the range 238 is adjustable. For example, the device 102 may be configured to perform an update operation in which the user positions the hand 190 in a preferred position relative to the device 102 so that the distance 250 can be detected and used to generate the range 238 (e.g., by applying a lower offset from the detected distance 250 to set a lower bound and applying an upper offset from the detected distance 250 to set an upper bound).

The activation signal unit 240 is configured to generate the indication 132 responsive to the first signal 231 indicating detection of the hand pattern 232 in the image data 212, the second signal 235 indicating detection of a hand temperature within a human hand temperature range, and the third signal 237 indicating detection that the hand 190 is within the range 238 (e.g., the hand 190 is at a distance 250 of 10 centimeters to 30 centimeters from the screen 110). For example, in an implementation in which each of the signals 231, 235, and 237 has a binary "1" value indicating detection and a binary "0" value indicating no detection, the activation signal unit 240 can generate the indication 132 as a logical AND of the signals 231, 235, and 237 (e.g., the indication 132 has a 1 value in response to all three signals 231, 235, 237 having a 1 value). In another example, the activation signal unit 240 is also configured to generate the indication 132 having a 1 value in response to any two of the signals 231, 235, 237 having a 1 value.

In other implementations, one or more of the signals 231, 235, and 237 has a multi-bit value indicating a likelihood that the corresponding hand detection criterion is satisfied. For example, the first signal 231 may have a multi-bit value that indicates a confidence that a hand pattern is detected, the second signal 235 may have a multi-bit value that indicates a confidence that a hand temperature is detected, and the third signal 237 may have a multi-bit value that indicates a confidence that the distance of the hand 190 from the device 102 is within the range 238. The activation signal unit 240 can combine the signals 231, 235, and 237 and compare the combined result to a threshold to generate the indication 132. For example, the activation signal unit 240 may apply a set of weights to determine a weighted sum of the signals 231, 235, and 237. The activation signal unit 240 may output the indication 132 having a value indicating hand detection responsive to the weighted sum exceeding the threshold. Values of weights and thresholds can be hardcoded or, alternatively, can be dynamically or periodically adjusted based on user feedback regarding false positives and false negatives, as described further below.

In some implementations, the hand detector 130 is further configured to generate a second indication 242 in response to detection that the hand 190 is no longer over the device 102. For example, hand detector may output the second indication 242 as having a 0 value (indicating that hand removal is not detected) responsive to detecting the hand 190, and may update the second indication 242 to have a 1 value in response to determining that the hand is no longer detected (e.g., to indicate a transition from a "hand detected" state to a "hand not detected" state). The second indication 242 can correspond to an end-of-utterance signal for the ASR system 140, as explained further with reference to FIG. 3.

Although FIG. 2 depicts multiple sensors including the ambient light sensor 204, the main camera 206, the infrared sensor 208, and the ultrasound sensor 210, in other implementations one or more of the ambient light sensor 204, the main camera 206, the infrared sensor 208, or the ultrasound sensor 210 is omitted. For example, although the ambient light sensor 204 enables generation of at least part of the image data 212 to detect hand shapes using reduced power as compared to using the main camera 206, in some implementations the ambient light sensor 204 is omitted and the main camera 206 is used to generate the image data. For power reduction, the main camera 206 can be operated according to an on/off duty cycle, such as at quarter-second intervals, for hand detection. As another example, although the main camera 206 enables generation of at least part of the image data 212 to detect hand shapes with higher resolution, and therefore higher accuracy, as compared to using the ambient light sensor 204, in some implementations the main camera 206 is omitted and the ambient light sensor 204 is used to generate the image data 212.

As another example, although the infrared sensor 208 enables generation of at the infrared sensor data 218 to detect whether an object has a temperature matching a human hand temperature, in other implementations the infrared sensor 208 is omitted and the device 102 performs hand detection without regard to temperature. As another example, although the ultrasound sensor 210 enables generation of the ultrasound sensor data 220 to detect whether a distance to an object is within the range 238, in other implementations the ultrasound sensor 210 is omitted and the device 102 performs hand detection without regard to distance from the device 102. Alternatively, one or more other mechanisms can be implemented for distance detection, such as by comparing object locations in image data from multiple cameras of the device 102 (e.g., parallax) o multiple cameras of a different device (e.g., a vehicle in which the device 102 is located) to estimate the distance 250, by using a size of a detected hand in the image data 212 or in the infrared sensor data 218 to estimate the distance 250, or by projecting structured light or other electromagnetic signals estimate object distance, as illustrative, non-limiting examples.

Although increasing a number of sensors and a variety of sensor types generally enhances accuracy of hand detection, in some implementations two sensors or a single sensor provides sufficient accuracy for hand detection. As a non-limiting example, in some implementations the only sensor data used for hand detection is the image data 212 from the ambient light sensor 204. Although in some implementations the sensors 120 are concurrently active, in other implementations one or more of the sensors 120 are controlled according to a "cascade" operation in which power is conserved by having one or more of the sensor 120 remain inactive until a hand detection criterion is satisfied based on sensor data from another of the sensors 120. To illustrate, the main camera 206, the infrared sensor 208, and the ultrasound sensor 210 may remain inactive until the hand pattern detector 230 detects the hand pattern 232 in the image data 212 generated by the ambient light sensor 204, in response to which one or more of the main camera 206, the infrared sensor 208, and the ultrasound sensor 210 is activated to provide additional sensor data for enhanced accuracy of hand detection.

Figure 3:
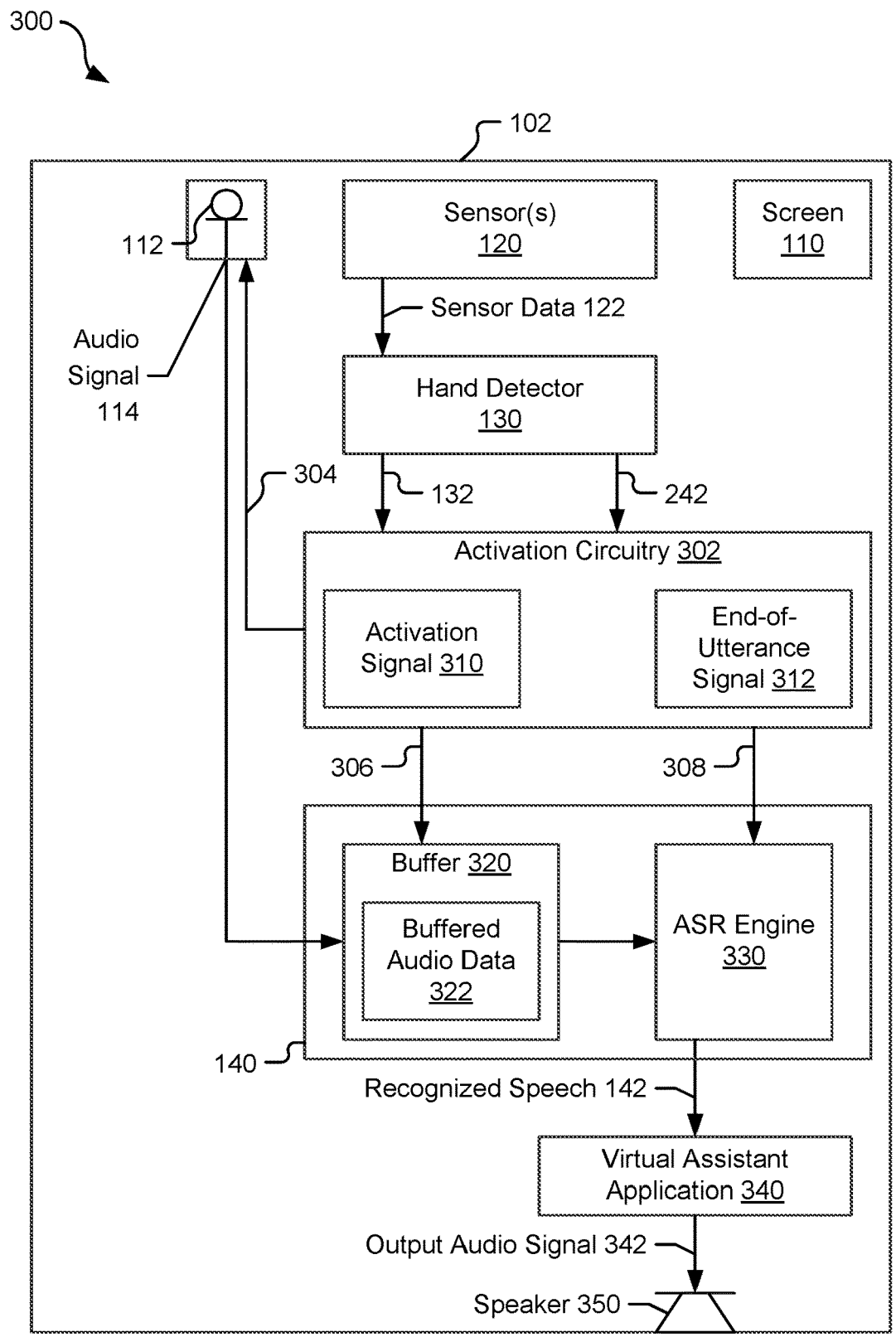
FIG. 3 is a diagram of another particular implementation of the device of FIG. 1.

FIG. 3 depicts an example 300 showing further aspects of components that can be implemented in the device 102. As illustrated in FIG. 3, activation circuitry 302 is coupled to the hand detector 130 and to the ASR system 140, and the ASR system includes a buffer 320 that is accessible to an ASR engine 330. The device 102 also includes a virtual assistant application 340 and a speaker 350 (e.g., the device 102 implemented as a wireless speaker and voice command device).

The activation circuitry 302 is configured to activate the automatic speech recognition system 140 in response to receiving the indication 132. For example, the activation circuitry 302 is configured to generate an activation signal 310 in response to the indication 132 transitioning to a state that indicates hand detection (e.g., the indication 132 transitions from a 0 value indicating no hand detection to a 1 value indicating hand detection). The activation signal 310 is provided to the ASR system 140 via a signal 306 to activate the ASR system 140. Activating the ASR system 140 includes initiating buffering of the audio signal 114 at the buffer 320 to generate buffered audio data 322. The activation signal 310 is also provided to the microphone 112 via a signal 304 that activates the microphone 112, enabling the microphone to generate the audio signal 114.

The activation circuitry 302 is also configured to generate an end-of-utterance signal 312. For example, the activation circuitry 302 is configured to generate the end-of-utterance signal 312 in response to the second indication 242 transitioning to a state that indicates an end of hand detection (e.g., the second indication 242 transitions from a 0 value (indicating no change in hand detection) to a 1 value (indicating that a detected hand is no longer detected)). The end-of-utterance signal 312 is provided to the ASR system 140 via a signal 308 to cause the ASR engine 330 to begin processing of the buffered audio data 332.

The activation circuitry 302 is configured to selectively activate one or more components of the ASR system 140. For example, the activation circuitry 302 may include or be coupled to power management circuitry, clock circuitry, head switch or foot switch circuitry, buffer control circuitry, or any combination thereof. The activation circuitry 302 may be configured to initiate powering-on of the buffer 320, the ASR engine 330, or both, such as by selectively applying or raising a voltage of a power supply of the buffer 320, the ASR engine 330, or both. As another example, the activation circuitry 302 may be configured to selectively gate or un-gate a clock signal to the buffer 320, the ASR engine 330, or both, such as to prevent circuit operation without removing a power supply.

The recognized speech 142 output by the ASR system 140 is provided to the virtual assistant application 340. For example, the virtual assistant application 340 may be implemented by one or more processors executing instructions, such as described in further detail with reference to FIG. 9. The virtual assistant application 340 may be configured to perform one or more search queries, such as via wireless connection to an internet gateway, search server, or other resource, searching a local storage of the device 102, or a combination thereof.

To illustrate, the audio signal 114 may represent the spoken question "what the weather like today?" The virtual assistant application 340 may generate a query to access an Internet-based weather service to obtain a weather forecast for a geographic region in which the device 102 is located. The virtual assistant application 340 is configured to generate an output, such as an output audio signal 342 that causes the speaker 350 to generate an auditory output, such as in a voice interface implementation. In other implementations, the virtual assistant application 340 generates another mode of output, such as a visual output signal that may be displayed by a screen or display that is integrated in the device 102 or coupled to the device 102.

In some implementations, values of parameters, such as weights and thresholds used by the device 102 (e.g., in the hand detector 130) can be set by a manufacturer or provider of the device 102. In some implementations, the device 102 is configured to adjust one or more such values during the life of the device 102 based on detected false negatives, false activations, or a combination thereof, associated with the ASR system 140. For example, a history of false activations can be maintained by the device 102 so that the characteristics of sensor data 122 that triggered the false activations can be periodically used to automatically adjust one or more weights or thresholds, such as to emphasize the relative reliability of one sensor over another for use in hand detection, to reduce a likelihood of future false activations.

Although particular values are included in the descriptions of FIGS. 1-3, such as a "1" value to indicate a positive result (e.g., hand detection) and a "0" value to indicate a negative result, it will be understood that such values are provided for explanatory purposes only and are not limitations. To illustrate, in some implementations the indication 132 is indicated by a "0" value. As another example, in some implementations a "1" value of the first signal 231 indicates a high likelihood that the hand pattern 232 is in the image data 212, while in other implementations a "0" value of the first signal 231 indicates a low likelihood the hand pattern 232 is in the image data 212. Similarly, in some implementations a "1" value of the second signal 235, the third signal 237, or both, indicates a high likelihood that a hand detection criterion is satisfied, in other implementations the "1" value of the second signal 235, the third signal 237, or both, indicates a high likelihood that a hand detection criterion is not satisfied.

Figure 4:
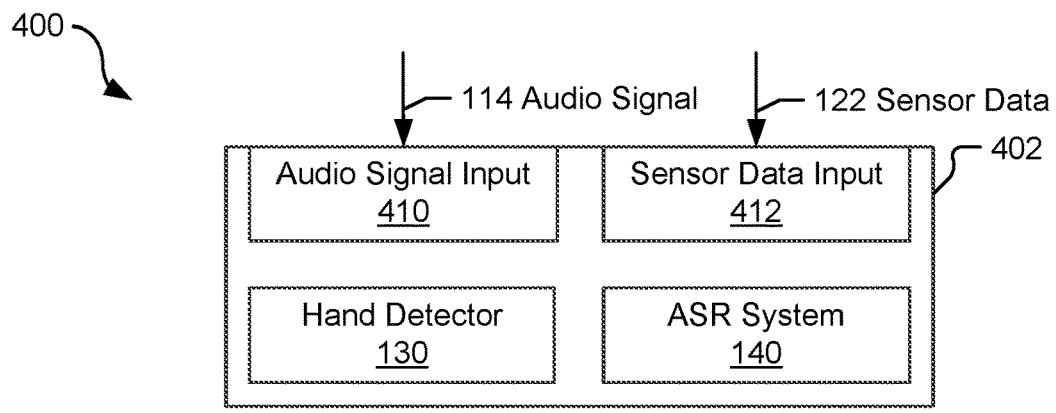
FIG. 4 is a diagram of another particular illustrative implementation of a device operable to activate speech recognition.
Figure 7:
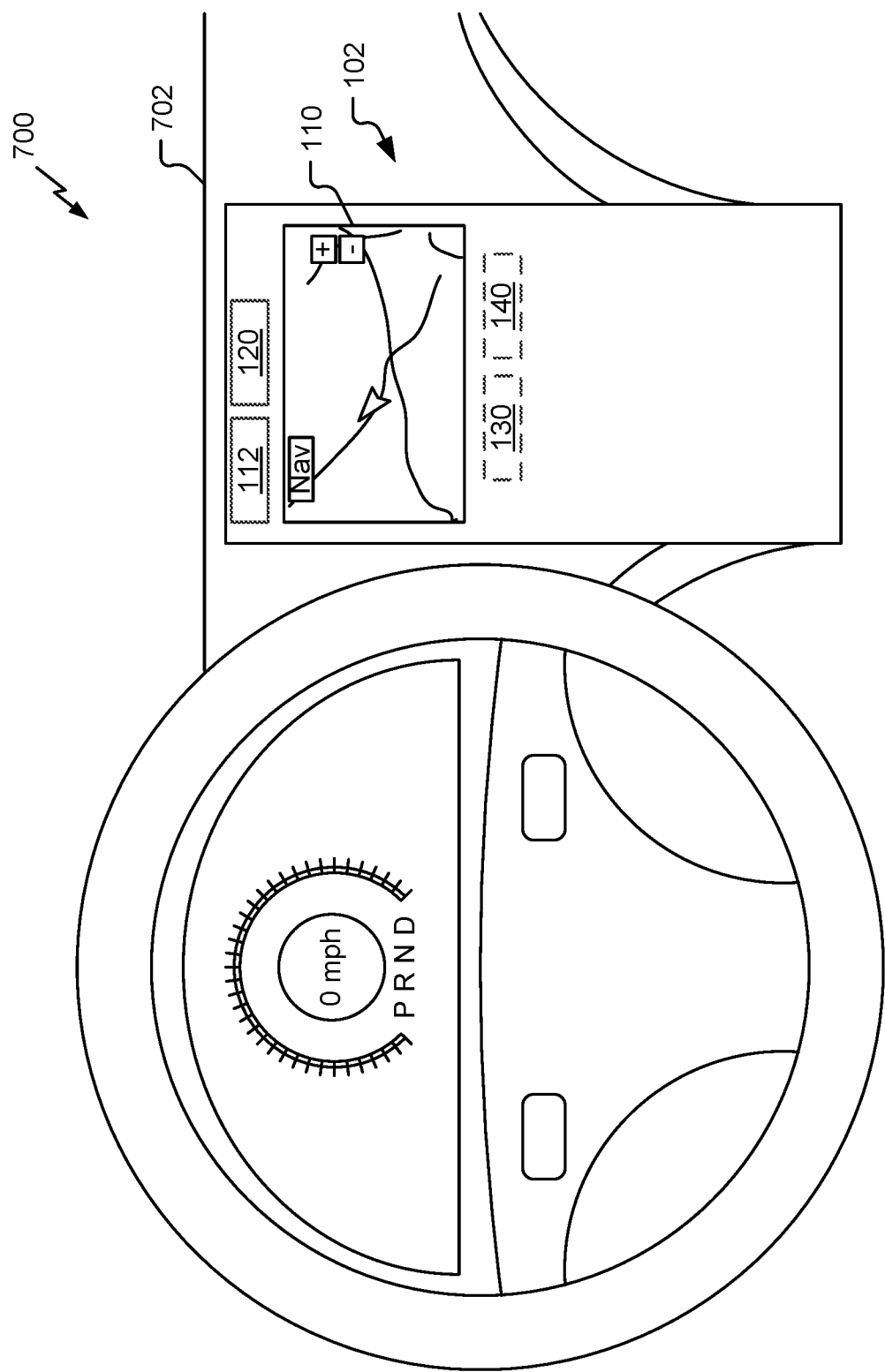
FIG. 7 is a diagram of a vehicle operable to activate speech recognition.
Figure 8:
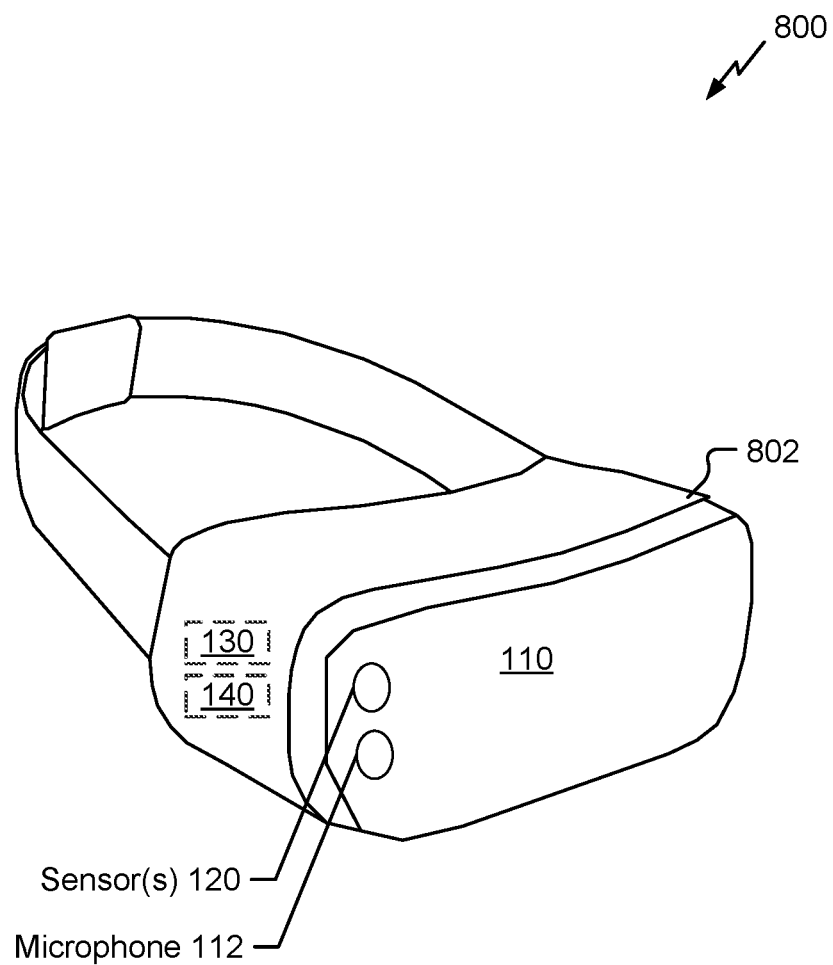
FIG. 8 is a diagram of a virtual reality or augmented reality headset operable to activate speech recognition.
Figure 9:
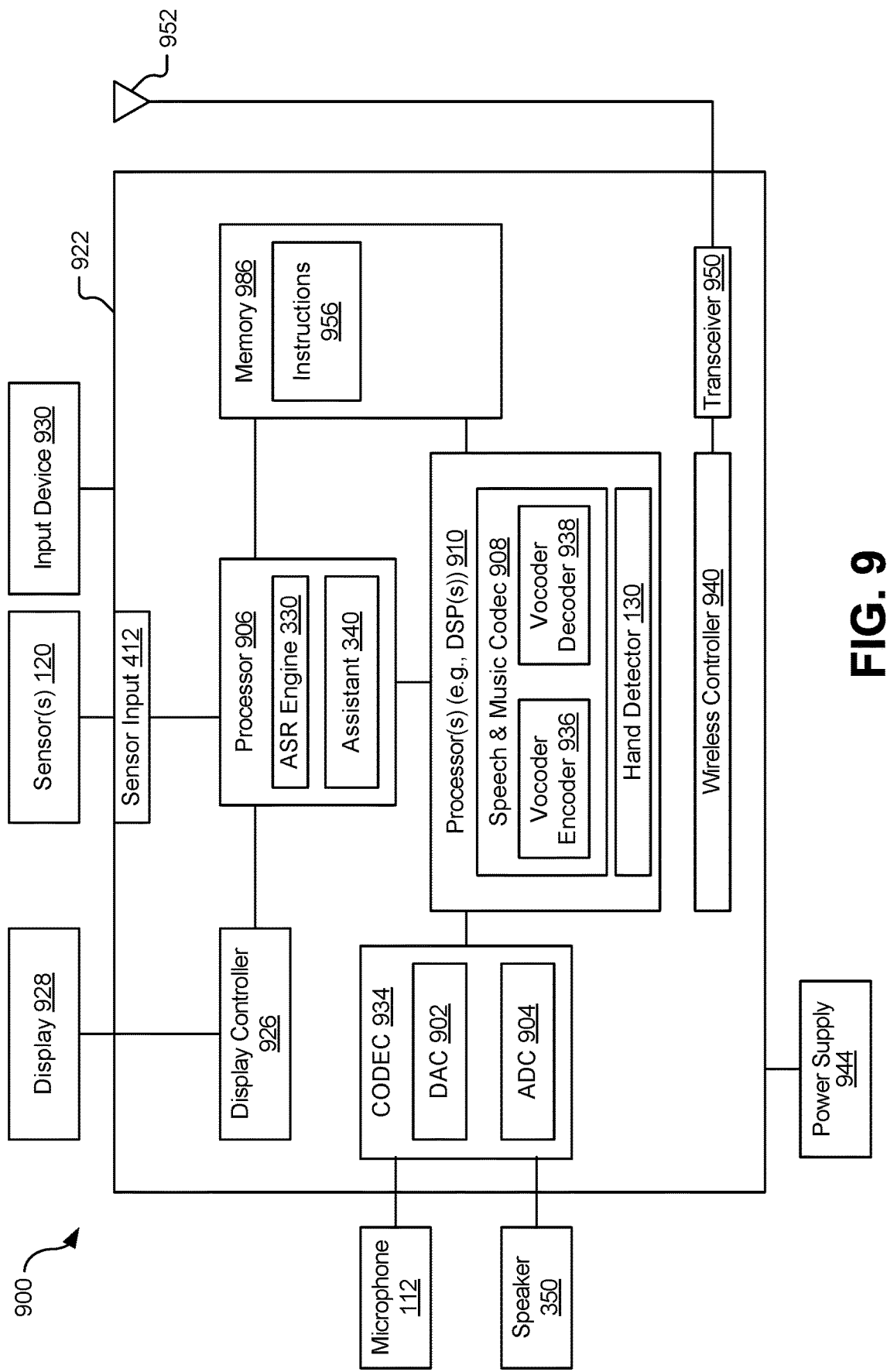
FIG. 9 is a block diagram of a particular illustrative example of a device that is operable to activate speech recognition.

FIG. 4 depicts an implementation 400 of a device 402 that includes the hand detector 130 and the ASR system 140 integrated in a discrete component, such as a semiconductor chip or package as described further with reference to FIG. 9. The device 402 includes an audio signal input 410, such as a first bus interface, to enable the audio signal 114 to be received from a microphone external to the device 402. The device 402 also includes a sensor data input 412, such as a second bus interface, to enable the sensor data 122, to be received from one or more sensors external to the device 402. The device 402 may further include one or more outputs to provide processing results (e.g., the recognized speech 142 or the output audio signal 342) to one or more external components (e.g., the speaker 350). The device 402 enables implementation of hand detection and voice recognition activation as a component in a system that includes a microphone and other sensors, such as in a vehicle as depicted in FIG. 7, a virtual reality or augmented reality headset as depicted in FIG. 8, or a wireless communication device as depicted in FIG. 9.

Figure 5:
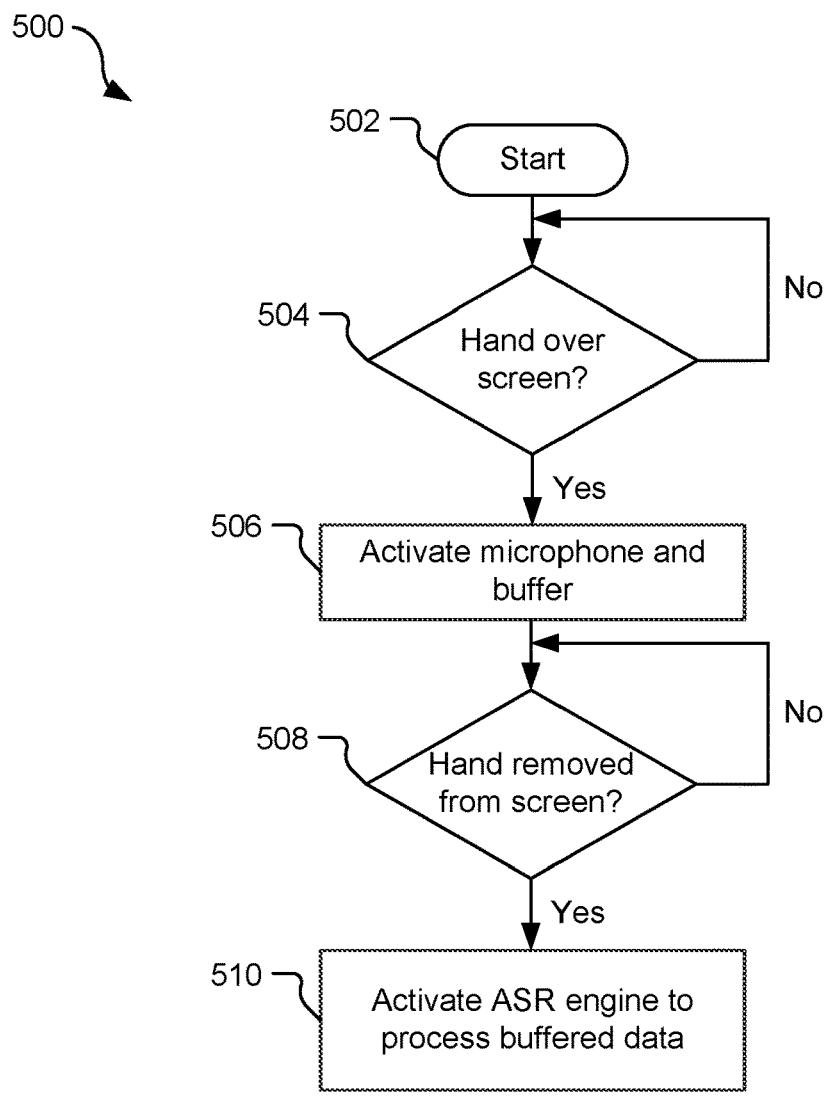
FIG. 5 is a diagram of a particular implementation of a method of activating speech recognition that may be performed by the device of FIG. 1.

Referring to FIG. 5, a particular implementation of a method 500 of processing an audio signal representing input sound is depicted that may be performed by the device 102 or the device 402. The method begins at 502 and includes determining whether a hand is over a screen of the device, at 504, such as by the hand detector 130 processing the sensor data 122. In response to detecting a hand over the screen, a microphone and buffer are activated, at 506. For example, the microphone 112 and the buffer 320 of FIG. 3 are activated by the activation circuitry 302 via the signals 304 and 306.

In response to determining that the hand has been removed from over the screen, at 508, the method 500 includes activating an ASR engine to process the buffered data, at 510. For example, the ASR engine 330 is activated by the signal 308 generated by the activation circuitry 302 to process the buffered audio data 322.

Activating ASR when a hand is detected over the screen enables a user to activate speech recognition for a voice command by positioning of the user's hand without having to speak an activation keyword or locate and press a dedicated button. As a result, speech recognition can be activated conveniently and safely, such as when the user is operating a vehicle. Further, because positioning the user's hand over the screen initiates activation of components to receive a voice command for speech recognition and removing the user's hand from over the screen initiates processing of the received voice command, improper activation, deactivation, or both, of speech recognition can both be reduced as compared to a system that instead uses keyword detection to activate speech recognition.

Figure 6:
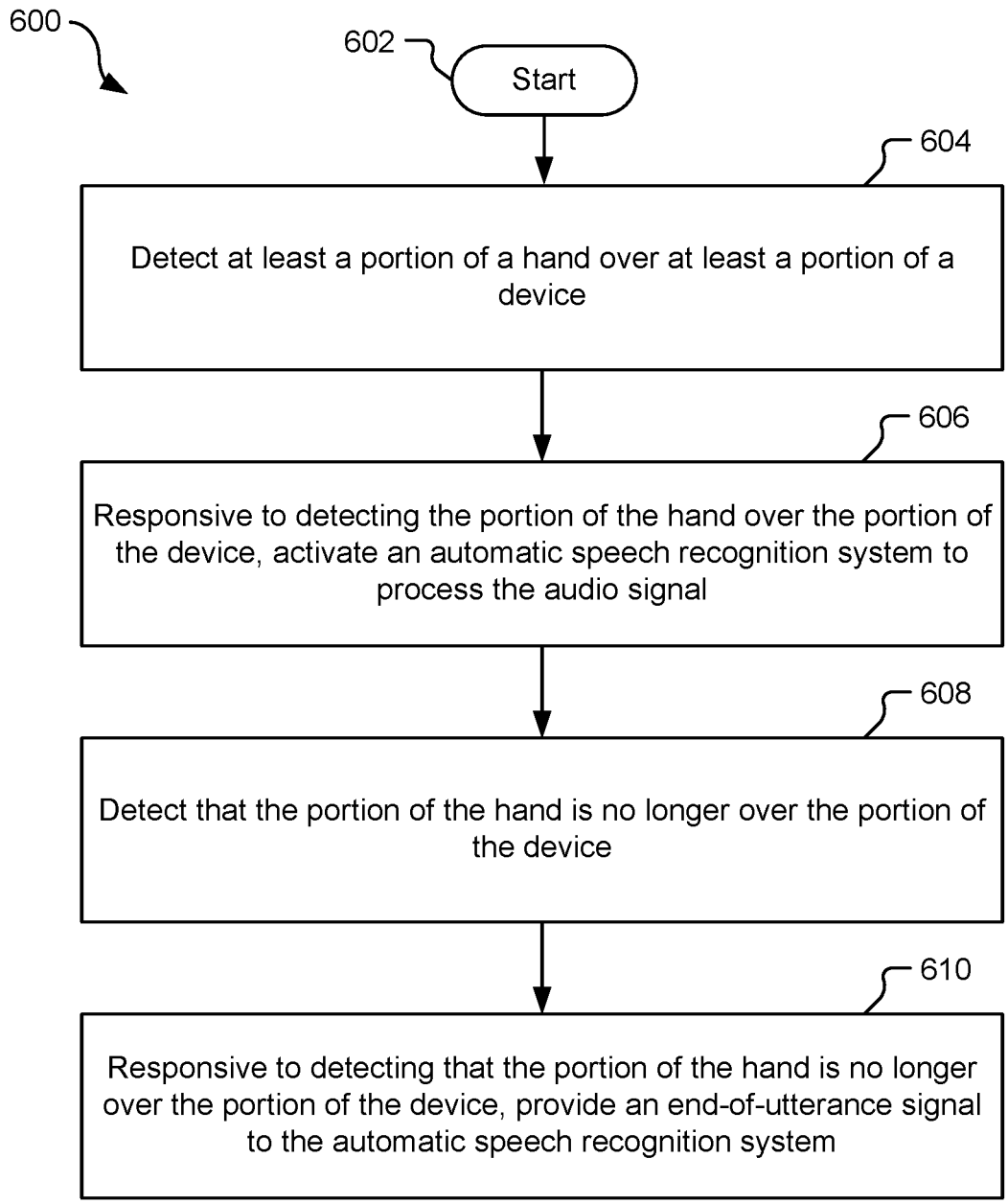
FIG. 6 is a diagram of another implementation of a method of activating speech recognition that may be performed by the device of FIG. 1.

Referring to FIG. 6, a particular implementation of a method 600 of processing an audio signal representing input sound is depicted that may be performed by the device 102 or the device 402, as illustrative, non-limiting examples.

The method 600 starts at 602 and includes detecting, at a device, at least a portion of a hand over at least a portion of the device, at 604. For example, the hand detector 130 detects the hand 190 via processing the sensor data 122 received from the one or more sensors 120. In some implementations, detecting the portion of the hand over the portion of the device includes processing image data (e.g., the image data 212) to determine whether the image data includes a hand pattern (e.g., the hand pattern 232). In an example, the image data is generated at a low-power ambient light sensor of the device, such as the ambient light sensor 204. Detecting the portion of the hand over the portion of the device may further include processing infrared sensor data from an infrared sensor of the device, such as the infrared sensor data 218. Detecting the portion of the hand over the portion of the device may also include processing ultrasound sensor data from an ultrasound sensor of the device, such as the ultrasound sensor data 220.

The method 600 includes, responsive to detecting the portion of the hand over the portion of the device, activating an automatic speech recognition system to process the audio signal, at 606. For example, the device 102 activates the ASR system 140 in response to the indication 132. In some implementations, activating the automatic speech recognition system includes initiating buffering of the audio signal, such as the device 102 (e.g., the activation circuitry 302) activating the buffer 320 via the signal 306. In some examples, responsive to detecting the portion of the hand over the portion of the device, such as over a screen of the device, the method 500 further includes activating a microphone to generate the audio signal based on the input sound, such as the device 102 (e.g., the activation circuitry 302) activating the microphone 112 via the signal 304.

In some implementations, the method 600 includes detecting that the portion of the hand is no longer over the portion of the device, at 608, and responsive to detecting that the portion of the hand is no longer over the portion of the device, providing an end-of-utterance signal to the automatic speech recognition system, at 610. In an example, the hand detector 130 detects that the hand is no longer over the portion of the device, and the activation circuitry 302 provides the end-of-utterance signal 312 to the ASR engine 330 responsive to the second indication 242.

By activating the ASR system responsive to detecting a hand over a portion of the device, the method 600 enables a user to activate speech recognition for a voice command without having to speak an activation keyword or locate and press a dedicated button. As a result, speech recognition can be activated conveniently and safely, such as when the user is operating a vehicle. In addition, false activation of the ASR system can both be reduced as compared to a system that instead uses keyword detection to activate speech recognition.

The method 500 of FIG. 5, the method 600 of FIG. 6, or both, may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 500 of FIG. 5, the method 600 of FIG. 6, or both, may be performed by a processor that executes instructions, such as described with reference to FIG. 9.

FIG. 7 depicts an example of an implementation 700 of the hand detector 130 and the ASR system 140 integrated into a vehicle dashboard device, such as a car dashboard device 702. A visual interface device, such as the screen 110 (e.g., a touchscreen display), is mounted within the car dashboard device 702 to be visible to a driver of the car. The microphone 112 and one or more sensors 120 are also mounted in the car dashboard device 702, although in other implementations one or more of the microphone 112 and the sensor(s) 120 can be located elsewhere in the vehicle, such as the microphone 112 in a steering wheel or near the driver's head. The hand detector 130 and the ASR system 140 as illustrated with dashed borders to indicate that the hand detector 130 and the ASR system 140 are not visible to occupants of the vehicle. The hand detector 130 and the ASR system 140 may be implemented in a device that also includes the microphone 112 and sensor(s) 120 such as in the device 102 of FIGS. 1-3, or may be separate from and coupled to the microphone 112 and sensor(s) 120, such as in the device 402 of FIG. 4.

In some implementations, multiple microphones 112 and sets of sensors 120 are integrated into the vehicle. For example, a microphone and set of sensors can be positioned at each passenger seat, such as at an armrest control panel or seat-back display device, to enable each passenger to enter voice commands using hand-over-device detection. In some implementations, each passenger's voice command may be routed to a common ASR system 140; in other implementations, the vehicle includes multiple ASR systems 140 to enable concurrent processing of voice commands from multiple occupants of the vehicle.

FIG. 8 depicts an example of an implementation 800 of the hand detector 130 and the ASR system 140 integrated into a headset 802, such as a virtual reality or augmented reality headset. The screen 110 is positioned in front of the user's eyes to enable display of augmented reality or virtual reality images or scenes to the user while the headset 802 is worn, and the sensor(s) 120 are positioned to detect when the user's hand is over (e.g., in front of) the screen 110 to initiate ASR recognition. The microphone 112 is located to receive the user's voice while the headset 802 is worn. While wearing the headset 802, the user can lift a hand in front of the screen 110 to indicate to the headset 802 that the user is about to speak a voice command to activate ASR, and can lower the hand to indicate that the user has finished speaking the voice command.

FIG. 9 depicts a block diagram of a particular illustrative implementation of a device 900 that includes the hand detector 130 and the ASR engine 330, such as in a wireless communication device implementation (e.g., a smartphone). In various implementations, the device 900 may have more or fewer components than illustrated in FIG. 9. In an illustrative implementation, the device 900 may correspond to the device 102. In an illustrative implementation, the device 900 may perform one or more operations described with reference to FIGS. 1-8.

In a particular implementation, the device 900 includes a processor 906 (e.g., a central processing unit (CPU)). The device 900 may include one or more additional processors 910 (e.g., one or more DSPs). The processors 910 may include a speech and music coder-decoder (CODEC) 908 and the hand detector 130. The speech and music codec 908 may include a voice coder ("vocoder") encoder 936, a vocoder decoder 938, or both.

The device 900 may include a memory 986 and a CODEC 934. The memory 986 may include instructions 956, that are executable by the one or more additional processors 910 (or the processor 906) to implement the functionality described with reference to the hand detector 130, the ASR engine 330, the ASR system 140 of FIG. 1, the activation circuitry 302, or any combination thereof. The device 900 may include a wireless controller 940 coupled, via a transceiver 950, to an antenna 952.

The device 900 may include a display 928 (e.g., the screen 110) coupled to a display controller 926. The speaker 350 and the microphone 112 may be coupled to the CODEC 934. The CODEC 934 may include a digital-to-analog converter 902 and an analog-to-digital converter 904. In a particular implementation, the CODEC 934 may receive analog signals from the microphone 112, convert the analog signals to digital signals using the analog-to-digital converter 904, and provide the digital signals to the speech and music codec 908. The speech and music codec 908 may process the digital signals, and the digital signals may further be processed by the ASR engine 330. In a particular implementation, the speech and music codec 908 may provide digital signals to the CODEC 934. The CODEC 934 may convert the digital signals to analog signals using the digital-to-analog converter 902 and may provide the analog signals to the speaker 350.

In a particular implementation, the device 900 may be included in a system-in-package or system-on-chip device 922. In a particular implementation, the memory 986, the processor 906, the processors 910, the display controller 926, the CODEC 934, and the wireless controller 940 are included in a system-in-package or system-on-chip device 922. In a particular implementation, an input device 930 (e.g., one or more of the sensor(s) 120) and a power supply 944 are coupled to the system-on-chip device 922. Moreover, in a particular implementation, as illustrated in FIG. 9, the display 928, the input device 930, the speaker 350, the microphone 112, the antenna 992, and the power supply 944 are external to the system-on-chip device 922. In a particular implementation, each of the display 928, the input device 930, the speaker 350, the microphone 112, the antenna 992, and the power supply 944 may be coupled to a component of the system-on-chip device 922, such as an interface or a controller.

The device 900 may include a smart speaker (e.g., the processor 906 may execute the instructions 956 to run the voice-controlled digital assistant application 340), a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) or Blu-ray disc player, a tuner, a camera, a navigation device, a virtual reality of augmented reality headset, a vehicle console device, or any combination thereof.

In conjunction with the described implementations, an apparatus to process an audio signal representing input sound includes means for detecting at least a portion of a hand over at least a portion of a device. For example, the means for detecting the portion of the hand can correspond to the hand detector 130, the hand pattern detector 230, the hand temperature detector 234, the hand distance detector 236, one or more other circuits or components configured to detect at least a portion of hand over at least a portion of a device, or any combination thereof.

The apparatus also includes means for processing the audio signal. The means for processing is configured to be activated responsive to detection of the portion of a hand over at the portion of the device. For example, the means for processing the audio signal can correspond to the ASR system 140, the ASR engine 330, the microphone 112, the CODEC 934, the speech and music codec 908, one or more other circuits or components configured to process the audio signal and activated responsive to detection of the portion of a hand over at the portion of the device, or any combination thereof.

In some implementations, the apparatus includes means for displaying information, and the means for detecting is configured to detect the portion of the hand over the means for displaying information. For example, the means for displaying information can include the screen 110, the display 928, the display controller 926, one or more other circuits or components configured to display information, or any combination thereof.

The apparatus may also include means for generating the audio signal based on the input sound, the means for generating configured to be activated responsive to detect the portion of the hand over the means for displaying information. For example, the means for generating the audio signal can correspond to the microphone 112, a microphone array, the CODEC 934, the speech and music codec 908, one or more other circuits or components configured to generate the audio signal based on the input sound and to be activated responsive to the first indication, or any combination thereof.

In some implementations, the apparatus includes means for generating image data, and the means for detecting is configured to determine whether the image data includes a hand pattern, such as the hand pattern detector 230. In some implementations, the apparatus includes at least one of: means for detecting a temperature associated with the portion of the hand (e.g., the hand temperature detector 234, the infrared sensor 208, or a combination thereof), and means for detecting a distance of the portion of the hand from the device (e.g., the hand distance detector 236, the ultrasound sensor 210, a camera array, a structured light projector, one or more other mechanism for detecting a distance of the portion of the hand from the device, or any combination thereof).

In some implementations, non-transitory computer-readable medium (e.g., the memory 986) includes instructions (e.g., the instructions 956) that, when executed by one or more processors of a device (e.g., the processor 906, the processor(s) 910, or any combination thereof), cause the one or more processors to perform operations for processing an audio signal representing input sound. The operations include detecting at least a portion of a hand over at least a portion of the device (e.g., at the hand detector 130). For example, detecting the portion of the hand over the portion of the device can include receiving the sensor data 122, processing the sensor data 122 using one or more detectors (e.g., the hand pattern detector 230, the hand temperature detector 234, or the hand distance detector 236) to determine whether one or more detection criteria are met, and generating the indication 132 at least partially in response to detection that the one or more criteria are met (e.g., as described with reference to the activation signal unit 240). For example, in some implementations, processing the sensor data 122 to determine whether a detection criterion is met includes applying a neural network classifier (e.g., as described with reference to the hand pattern detector 230) that is trained to recognize the hand pattern 232 to process the image data 212 or applying one or more filters to the image data 212 to detect the hand pattern 232.

The operations also include, responsive to detecting the portion of the hand over the portion of the device, activating an automatic speech recognition system to process the audio signal. For example, activating the automatic speech recognition can include detecting the indication 132 at an input to the ASR system 140 and, in response to detecting the indication 132, performing at least one of a power-up or clock activation for at least one component (e.g., the buffer 320, the ASR engine 330) of the ASR system 140.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to process an audio signal representing input sound, the device comprising:
   a hand detector configured to:
      generate a first indication responsive to detection of at least a portion of a hand over at least a portion of the device, the detection based on using a plurality of filters on image data to detect one or more hand patterns; and
   an automatic speech recognition system configured to be activated, responsive to the first indication, to process the audio signal.

2. The device of claim 1, further comprising one or more sensors coupled to the hand detector and configured to provide sensor data to the hand detector.

3. The device of claim 2, wherein the one or more sensors include a camera configured to provide the image data to the hand detector.

4. The device of claim 3, wherein the camera includes a low-power ambient light sensor configured to generate the image data.

5. The device of claim 3, wherein the hand detector includes a hand pattern detector configured to process the image data to determine whether the image data includes the one or more hand patterns.

6. The device of claim 5, wherein the one or more sensors further include an infrared sensor.

7. The device of claim 6, wherein the hand detector further includes a hand temperature detector configured to process infrared sensor data from the infrared sensor.

8. The device of claim 2, wherein the hand detector applies a set of weights to signals from the one or more sensors to determine a weighted sum, and wherein the first indication is determined based on the weighted sum.

9. The device of claim 1, further comprising:
   a screen, wherein the hand detector is configured to generate the first indication responsive to detection of at least a portion of the hand over the screen; and a microphone configured to be activated, responsive to the first indication, to generate the audio signal based on the input sound.

10. The device of claim 9, wherein the hand detector includes a hand distance detector and is configured to generate the first indication responsive to detection that the portion of the hand is hovering over the screen and at a distance that is within a range of 10 centimeters to 30 centimeters from the screen.

11. The device of claim 1, wherein the automatic speech recognition system includes a buffer and an automatic speech recognition engine, and wherein activating the automatic speech recognition system includes initiating buffering of the audio signal at the buffer.

12. The device of claim 11, wherein the hand detector is further configured to generate a second indication in response to detection that the portion of the hand is no longer over the portion of the device, and wherein the second indication corresponds to an end-of-utterance signal that causes the automatic speech recognition engine to begin processing audio data from the buffer.

13. The device of claim 1, wherein the hand detector and the automatic speech recognition system are integrated in a vehicle.

14. The device of claim 1, wherein the hand detector and the automatic speech recognition system are integrated in a portable communication device.

15. The device of claim 1, wherein the hand detector and the automatic speech recognition system are integrated in a virtual reality or augmented reality headset.

16. A method of processing an audio signal representing input sound, the method comprising:
detecting, at a device, at least a portion of a hand over at least a portion of the device, the detection based on using a plurality of filters on image data to detect one or more hand patterns; and
responsive to detecting the portion of the hand over the portion of the device, activating an automatic speech recognition system to process the audio signal.

17. The method of claim 16, wherein detecting the portion of the hand over the portion of the device includes processing the image data to determine whether the image data includes the one or more hand patterns.

18. The method of claim 17, wherein the image data is generated at a low-power ambient light sensor of the device.

19. The method of claim 17, wherein detecting the portion of the hand over the portion of the device further includes processing infrared sensor data from an infrared sensor of the device.

20. The method of claim 16, wherein the portion of the device includes a screen of the device, and further comprising, responsive to detecting the portion of the hand over the screen, activating a microphone to generate the audio signal based on the input sound.

21. The method of claim 16, further comprising responsive to detecting that the portion of the hand is no longer over the portion of the device, providing an end-of-utterance signal to the automatic speech recognition system.

22. The method of claim 16, wherein activating the automatic speech recognition system includes initiating buffering of the audio signal.

23. A non-transitory computer-readable medium comprising instructions that, when executed by one or more processors of a device, cause the one or more processors to perform operations for processing an audio signal representing input sound, the operations comprising:
detecting at least a portion of a hand over at least a portion of the device, the detection based on using a plurality of filters on image data to detect one or more hand patterns; and
responsive to detecting the portion of the hand over the portion of the device, activating an automatic speech recognition system to process the audio signal.

24. The non-transitory computer-readable medium of claim 23, wherein the portion of the device includes a screen of the device, the operations further comprising, responsive to detecting the portion of the hand over the screen, activating a microphone to generate the audio signal based on the input sound.

25. The non-transitory computer-readable medium of claim 23, the operations further comprising responsive to detecting that the portion of the hand is no longer over the portion of the device, providing an end-of-utterance signal to the automatic speech recognition system.

26. The non-transitory computer-readable medium of claim 23, wherein detecting the portion of the hand over the portion of the device includes processing infrared sensor data from an infrared sensor of the device.

27. An apparatus to process an audio signal representing input sound, the apparatus comprising:
means for detecting, based on using a plurality of filters on image data to detect one or more hand patterns, at least a portion of a hand over at least a portion of a device; and
means for processing the audio signal, the means for processing configured to be activated responsive to detection of the portion of the hand over at least the portion of the device.

28. The apparatus of claim 27, further comprising means for generating the image data.

29. The apparatus of claim 28, further comprising at least one of:
means for detecting a temperature associated with the portion of the hand, and
means for detecting a distance of the portion of the hand from the device.

30. The apparatus of claim 27, further comprising:
means for displaying information, wherein the means for detecting is configured to detect the portion of the hand over the means for displaying information; and
means for generating the audio signal based on the input sound, the means for generating configured to be activated responsive to detection of the portion of the hand over the means for displaying.

* * * * *